(12) United States Patent
Patel et al.

(10) Patent No.: US 9,841,946 B1
(45) Date of Patent: Dec. 12, 2017

(54) METHOD AND APPARATUS FOR MODULO OPERATION

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 82 days.

(21) Appl. No.: 14/938,053

(22) Filed: Nov. 11, 2015

(51) Int. Cl.
*G06F 7/38* (2006.01)
*G06F 7/72* (2006.01)

(52) U.S. Cl.
CPC .............. *G06F 7/38* (2013.01); *G06F 7/727* (2013.01)

(58) Field of Classification Search
CPC .................................. G06F 7/72; G06F 7/727
See application file for complete search history.

(56) References Cited

U.S. PATENT DOCUMENTS

| 5,499,202 A | * | 3/1996 | Takahashi | ............... G06F 7/727 708/274 |
| 2011/0145311 A1 | * | 6/2011 | Jin | .......................... G06F 7/727 708/491 |

* cited by examiner

*Primary Examiner* — Chuong D Ngo
(74) *Attorney, Agent, or Firm* — Lerner, David, Littenberg, Krumholz & Mentlik, LLP

(57) ABSTRACT

In some applications, such as randomization and cryptography, remainder computation for a number is required. The remainder computation is also used in modulo arithmetic. The remainder computation can be simplified when the divisor belongs to a certain class of numbers. A method and apparatus are disclosed that enable low complexity implementation of remainder computation of any number when the divisor belongs to a type of numbers that can be represented as $2^k+1$.

3 Claims, 5 Drawing Sheets

| Row number | Description of Operation | Bit Position | | | | | | | |
|---|---|---|---|---|---|---|---|---|---|
| | | b7 | b6 | b5 | b4 | b3 | b2 | b1 | b0 |
| 1 | Binary representation of dividend ($m$ = 173) | 1 | 0 | 1 | 0 | 1 | 1 | 0 | 1 |
| 2 | Weight of each bit position | 128 | 64 | 32 | 16 | 8 | 4 | 2 | 1 |
| 3 | Number divisible by divisor ($n$ = 5) and is nearest to the weight of the bit position | 130 | 65 | 30 | 15 | 10 | 5 | 0 | 0 |
| 4 | Difference ($\Delta$) between weight of each bit position and nearest number divisible by divisor ($n$ = 5) | -2 | -1 | 2 | 1 | -2 | -1 | 2 | 1 |
| 5 | Difference ($D$) multiplied by the value of the bit in the respective bit position (Row #1 multiplied by Row #5) | -2 | 0 | 2 | 0 | -2 | -1 | 0 | 1 |
| 6 | Sum of all valid Differences ($D$) in row #5 | (-2)+0+2+(-2)+(-1)+0+1 = -2 | | | | | | | |
| 7 | Final remainder value computation: If the number is negative, recursively add divisor ($n$ = 5) to it until it becomes positive If the number is positive, recursively subtract divisor ($n$ = 5) from it until it becomes less than divisor | 5 - 2 = 3 | | | | | | | |

| Row number | Description of Operation | Bit Position | | | | | | | |
|---|---|---|---|---|---|---|---|---|---|
| | | b7 | b6 | b5 | b4 | b3 | b2 | b1 | b0 |
| 1 | Binary representation of dividend (m = 173) | 1 | 0 | 1 | 0 | 1 | 1 | 0 | 1 |
| 2 | Weight of each bit position | 128 | 64 | 32 | 16 | 8 | 4 | 2 | 1 |
| 3 | Number divisible by divisor (n = 5) and is nearest to the weight of the bit position | 130 | 65 | 30 | 15 | 10 | 5 | 0 | 0 |
| 4 | Difference (Δ) between weight of each bit position and nearest number divisible by divisor (n = 5) | -2 | -1 | 2 | 1 | -2 | -1 | 2 | 1 |
| 5 | Difference (D) multiplied by the value of the bit in the respective bit position (Row #1 multiplied by Row #5) | -2 | 0 | 2 | 0 | -2 | -1 | 0 | 1 |
| 6 | Sum of all valid Differences (D) in row #5 | (-2)+0+2+(-2)+(-1)+0+1 = -2 | | | | | | | |
| 7 | Final remainder value computation: If the number is negative, recursively add divisor (n = 5) to it until it becomes positive If the number is positive, recursively subtract divisor (n = 5) from it until it becomes less than divisor | 5 - 2 = 3 | | | | | | | |

FIG. 1

METHOD AND APPARATUS FOR MODULO OPERATION

BACKGROUND

Many applications require the computation of a remainder when a dividend m is divided by a divisor n. The general case of any arbitrary numerator (dividend) and arbitrary denominator (divisor) may require actual division computation which may be a computationally expensive operation.

For a specific class of divisor values, there are methods available in literature that enable a reduced complexity implementation of the remainder computation. For example, if the divisor n is a power of two, the remainder of m/n operation can be obtained by simply using the lowest $\log_2(n)$ bits of the dividend m. However, there is no general method to efficiently compute a remainder for different divisor values. Cunningham numbers are a simple type of binomial numbers of the form $b^k \pm 1$ where b and k are integers and b is not already a power of some other number. In some applications a class of Cunningham numbers is used for the purpose of randomization. An example of this is the $3^{rd}$ Generation Partnership Project (3GPP) Long term Evolution (LTE) wireless communication system. In 3GPP LTE wireless communication system, a client terminal needs to search for the resource assignment messages from a wireless communication network. This search involves remainder computation with the divisor being a Cunningham number. Specifically, a client terminal is required to perform the following operation:

$$Y_k = (A * Y_{k-1}) \bmod D \qquad (EQ. 1)$$

where A=39827, D=65537 and k ranges from 0 to 9 with $Y_{k-1}$ initialized to some non-zero value. By definition the parameter $Y_k$ is constrained to be within 16 bits. The divisor D in this case is a member of a class of Cunningham numbers, i.e., $D=65537=2^{16}+1$. A method and apparatus are disclosed that enable low complexity implementation of remainder computation when the divisor is a class of Cunningham numbers.

SUMMARY

In accordance with an aspect of the present invention, a method for computation of a remainder of dividing a dividend by a divisor when searching a signal obtained from a wireless communication network for a predetermined message, in which the divisor is equal to $b^k \pm 1$, b and k are integers and b is not a power of another number, may include controlling, by a processing device, for each bit position of a binary representation of the dividend: subtracting, from a weight of the bit position, an integral multiple of the divisor nearest to the weight of the bit position, to obtain a difference, and multiplying the difference by a value of the bit position to obtain a product. In addition, the method may include controlling, by the processing device, summing the products respectively for the bit positions to obtain a first sum, in which the remainder is the first sum unless the first sum is (i) negative or (ii) positive and greater than the divisor; and controlling, by the processing device, when the first sum is negative, adding the divisor recursively to the first sum to obtain a second sum until the second sum is positive, in which the remainder is the second sum when the second sum is positive, and when the first sum is positive and greater than the divisor, recursively subtracting the divisor from the first sum to obtain a third sum until the third sum is less than the divisor, in which the remainder is the third sum when the third sum is less than the divisor.

In accordance with an aspect of the present invention, a method for computation of a remainder of dividing a dividend by a divisor when searching a signal obtained from a wireless communication network for a predetermined message, in which the divisor is equal to $b^k \pm 1$, b and k are integers and b is not a power of another number, may include controlling, by a processing device, multiplying a first binary representation of a first value by a second binary representation of a second value, to obtain a product, in which the product is the dividend and a value of the product has a third binary representation of at most a predetermined number of bits; and subtracting a first sequence of bits of the third binary representation from a second sequence of bits of the third binary representation to obtain a difference, in which the first sequence includes consecutive first bits of the third binary representation decreasing in significance and beginning with a most significant bit of the third binary representation, in which the second sequence includes consecutive second bits of the third binary representation decreasing in significance and beginning with a bit of the third binary representation next less significant than a least significant bit of the first sequence of bits, and in which the first and second sequences of bits include a same number of bits, in which, when the difference is positive, the remainder is the difference, and when the difference is negative, the remainder is a sum of the difference and the divisor.

In one alternative, the predetermined number may be according to k.

In one alternative, the first value may be equal to 39,827, the second value may be a non-zero value and the divisor may be equal to 65,537.

In one alternative, the divisor may be $b^k+1$ and k may be even.

In accordance with an aspect of the present invention, an apparatus for computation of a remainder of dividing a dividend by a divisor when searching a signal obtained from a wireless communication network for a predetermined message, in which the divisor is equal to $b^k \pm 1$, b and k are integers and b is not a power of another number, may include circuitry. The circuitry may be configured to control, for each bit position of a binary representation of the dividend: subtracting, from a weight of the bit position, an integral multiple of the divisor nearest to the weight of the bit position, to obtain a difference, and multiplying the difference by a value of the bit position to obtain a product; In addition, the circuitry may be configured to control summing the products respectively for the bit positions to obtain a first sum, in which the remainder is the first sum unless the first sum is (i) negative or (ii) positive and greater than the divisor. Further, the circuitry may be configured to control: when the first sum is negative, adding the divisor recursively to the first sum to obtain a second sum until the second sum is positive, in which the remainder is the second sum when the second sum is positive, and when the first sum is positive and greater than the divisor, recursively subtracting the divisor from the first sum to obtain a third sum until the third sum is less than the divisor, in which the remainder is the third sum when the third sum is less than the divisor.

In accordance with an aspect of the present invention, an apparatus for computation of a remainder of dividing a dividend by a divisor when searching a signal obtained from a wireless communication network for a predetermined message, in which the divisor is equal to $b^k \pm 1$, b and k are integers and b is not a power of another number, may include circuitry configured to control: multiplying a first binary representation of a first value by a second binary representation of a second value, to obtain a product, in which the product is the dividend and a value of the product has a third binary representation of at most a predetermined number of bits; and subtracting a first sequence of bits of the third binary representation from a second sequence of bits of the third binary representation to obtain a difference, in which the first sequence includes consecutive first bits of the third binary representation decreasing in significance and beginning with a most significant bit of the third binary representation, in which the second sequence includes consecutive second bits of the third binary representation decreasing in significance and beginning with a bit of the third binary representation next less significant than a least significant bit of the first sequence of bits, and in which the first and second sequences of bits include a same number of bits, in which, when the difference is positive, the remainder is the difference, and when the difference is negative, the remainder is a sum of the difference and the divisor.

In one alternative of the apparatus, the predetermined number may be according to k.

In one alternative of the apparatus, the first value may be equal to 39,827, the second value may be a non-zero value and the divisor may be equal to 65,537.

In one alternative of the apparatus, the divisor may be $b^k+1$ and k may be even.

In accordance with an aspect of the present invention, a wireless communication device may include a receiver to receive a signal obtained from a wireless communication network; and a processing device. The processing device may be configured to compute a remainder of dividing a dividend by a divisor when searching the signal for a predetermined message, in which the divisor is equal to $b^k±1$, b and k are integers and b is not a power of another number. In addition, the processing device may be configured to control, for each bit position of a binary representation of the dividend: subtracting, from a weight of the bit position, an integral multiple of the divisor nearest to the weight of the bit position, to obtain a difference, and multiplying the difference by a value of the bit position to obtain a product. Further, the processing device may be configured to control summing the products respectively for the bit positions to obtain a first sum, in which the remainder is the first sum unless the first sum is (i) negative or (ii) positive and greater than the divisor. In addition, the processing device may be configured to control when the first sum is negative, adding the divisor recursively to the first sum to obtain a second sum until the second sum is positive, in which the remainder is the second sum when the second sum is positive, and when the first sum is positive and greater than the divisor, recursively subtracting the divisor from the first sum to obtain a third sum until the third sum is less than the divisor, in which the remainder is the third sum when the third sum is less than the divisor.

In accordance with an aspect of the present invention, a wireless communication may include a receiver to receive a signal obtained from a wireless communication network; and a processing device. The processing device may be configured to compute a remainder of dividing a dividend by a divisor when searching the signal for a predetermined message, in which the divisor is equal to $b^k±1$, b and k are integers and b is not a power of another number. In addition, the processing device may be configured to control: multiplying a first binary representation of a first value by a second binary representation of a second value, to obtain a product, in which the product is the dividend and a value of the product has a third binary representation of at most a predetermined number of bits; and subtracting a first sequence of bits of the third binary representation from a second sequence of bits of the third binary representation to obtain a difference, in which the first sequence includes consecutive first bits of the third binary representation decreasing in significance and beginning with a most significant bit of the third binary representation, in which the second sequence includes consecutive second bits of the third binary representation decreasing in significance and beginning with a bit of the third binary representation next less significant than a least significant bit of the first sequence of bits, and in which the first and second sequences of bits include a same number of bits, in which, when the difference is positive, the remainder is the difference, and when the difference is negative, the remainder is a sum of the difference and the divisor.

In one alternative of the device, the predetermined number may be according to k.

In one alternative of the device, the first value may be equal to 39,827, the second value may be a non-zero value and the divisor may be equal to 65,537.

In one alternative of the device, the divisor may be $b^k+1$ and k may be even.

BRIEF DESCRIPTION OF THE DRAWINGS

FIG. 1 illustrates a first method for remainder computation according to the aspects of the present invention.

DETAILED DESCRIPTION

Figure 2:
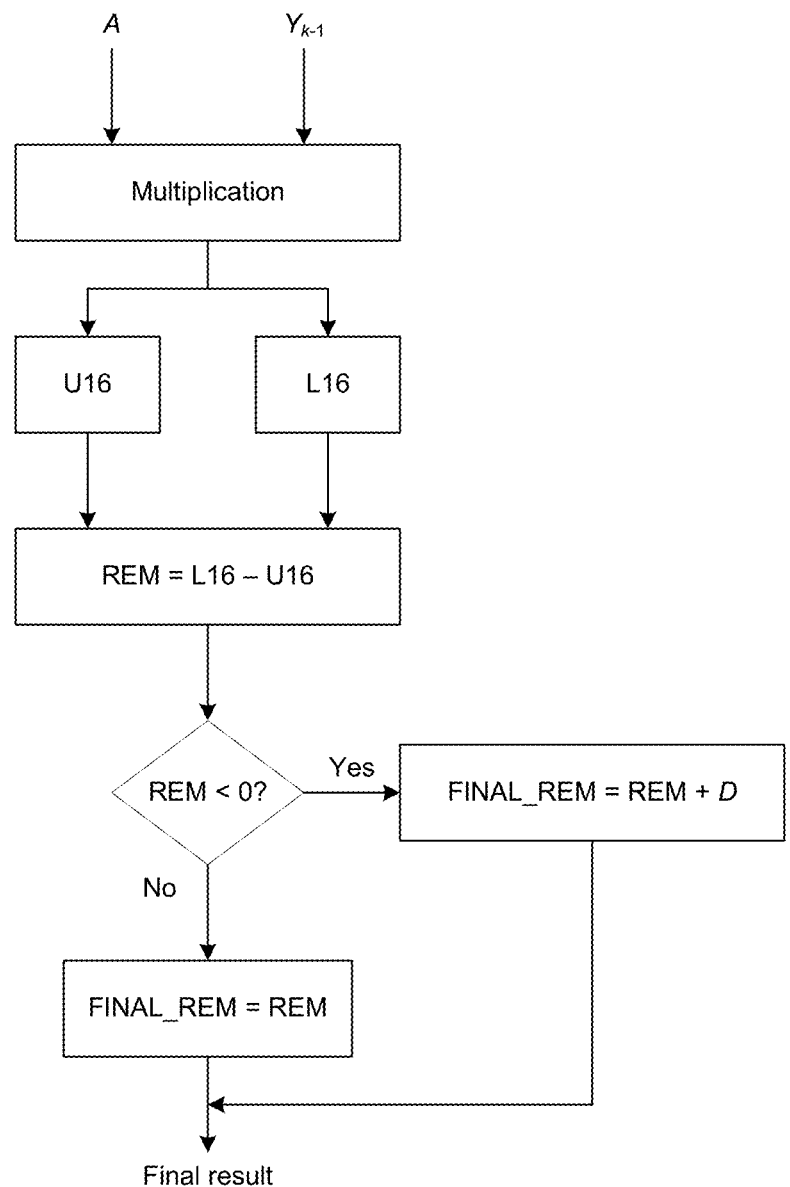
FIG. 2 illustrates a second method for remainder computation according to the aspects of the present invention.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Two methods and apparatus are described to efficiently compute the remainder of any number when the divisor is a class of Cunningham numbers. The first method is illustrated with an example where the dividend is m=173 and the divisor is $n=5=2^2+1$. The computation of a remainder according to the aspects of the present invention is illustrated in the table contained FIG. 1. Row 1 in FIG. 1 shows the binary representation of the dividend. Row 2 shows the weight of each bit position for binary representation. Row 3 shows the nearest number that is integral multiple of the divisor and is closest to the weight of each bit position. Row 4 shows the difference (Δ) between Row 2 and Row 3. Row 5 shows the multiplication of Row 4 with Row 1 to get only the values in Row 4 that are relevant for the given dividend. Row shows the combination of all the valid Δ from Row 5. According to an aspect of the present invention, the valid Δ from Row 5 are combined to generate the partial sum in Row 6. According to another aspect of the present invention, if this partial sum is negative, then the divisor (in this example the divisor n=5) is added recursively until the updated partial sum becomes positive. When the partial sum becomes positive, that is the required remainder of the division operation. According to another aspect of the invention, if the partial sum in Row 6 is positive but greater than the divisor, then the divisor is subtracted from the partial sum until it becomes less than the divisor. When the partial sum does become less than divisor, that is the required remainder of the division operation.

For the 3GPP LTE specific remainder computation specified by EQ. 1, the computation of the remainder may be performed more efficiently as illustrated in FIG. 2. Based on the definition of the parameter $Y_k$ in EQ. 1, its value is constrained to be within 32 bits. As shown in FIG. 2, the product of the two terms $(A*Y_{k-1})$ is computed first. This may be implemented in a number of different ways such as a 16×16 bit multiplier. Alternatively, the multiplication may be implemented with a shift-and-add method by using only adders or using canonical signed digit representation of the input number which may require fewer adders and subtractors than shift-and-add method.

Regardless of the product term that is obtained, it is then split into two parts: upper 16 bits (U16) and lower 16 bits (L16) as shown in FIG. 2. This is equivalent to grouping the dividend into 16-bit groups, i.e., according to the power of the base of the divisor n. The operation in EQ. 1 can be carried out by subtracting U16 from L16 as shown in FIG. 2 to obtain the remainder (REM). If the result of subtraction (REM) is positive then the final result of EQ. 1 is obtained (FINAL_REM). If the result of subtraction is negative then the final result of EQ. 1 (FINAL_REM) is obtained by adding divisor D=65537 to the REM. For example, suppose the product term $(A*Y_{k-1})$=492022758. The binary representation of this number is:
00011101010100111010101111100110
The upper 16 bits (U16) are 0001110101010011 and the lower 16 bits (L16) are 1010101111100110. Therefore,
REM=L16−U16=1010101111100110−
0001110101010011
=44006−7507
=36499
Since this is a positive number, (492022758 mod 65537)=36499 is the final value of the remainder, i.e., FINAL_REM=REM.
As another example, suppose the product term $(A*Y_{k-1})$=3158323257. The binary representation of this number is:
10111100010000000011000000111001
The upper 16 bits (U16) are 1011110001000000 and the lower 16 bits (L16) are 0011000000111001. Therefore,
REM=L16−U16=0011000000111001−
1011110001000000
=12345−48192
=−35847
Since this is a negative number, value of D is added to the answer: −35847+D=29690 to obtain the final answer, i.e., FINAL_REM=REM+D. This is the same as the remainder obtained by direct computation, i.e., (3158323257 mod 65537)=29690.

The methods disclosed according to aspects of this invention enable a reduced complexity implementation of remainder computation when the divisor belongs to a class of Cunningham numbers such that they are of the form $b^k+1$ and where k is even. The disclosed method may reduce the hardware complexity and power consumption of the 3GPP LTE client terminals.

By way of example only, the above described method may be implemented in a user device such as a wireless mobile station (MS).

Figure 3:
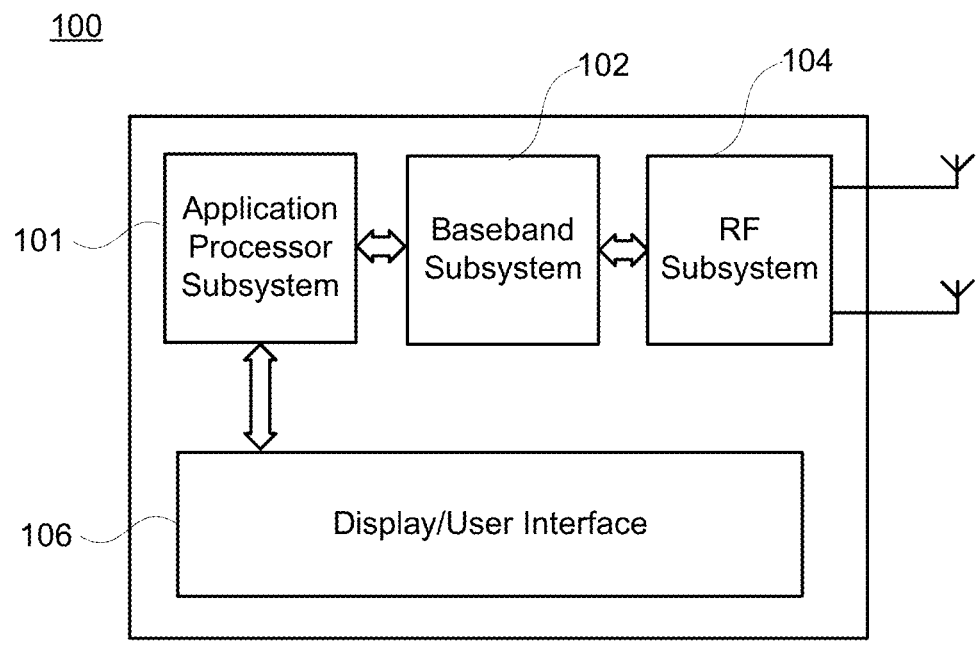
FIG. 3 illustrates a wireless mobile station diagram, which may be employed with aspects of the invention described herein.

As shown in FIG. 3, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all Integrated as one integrated chip.

Figure 4:
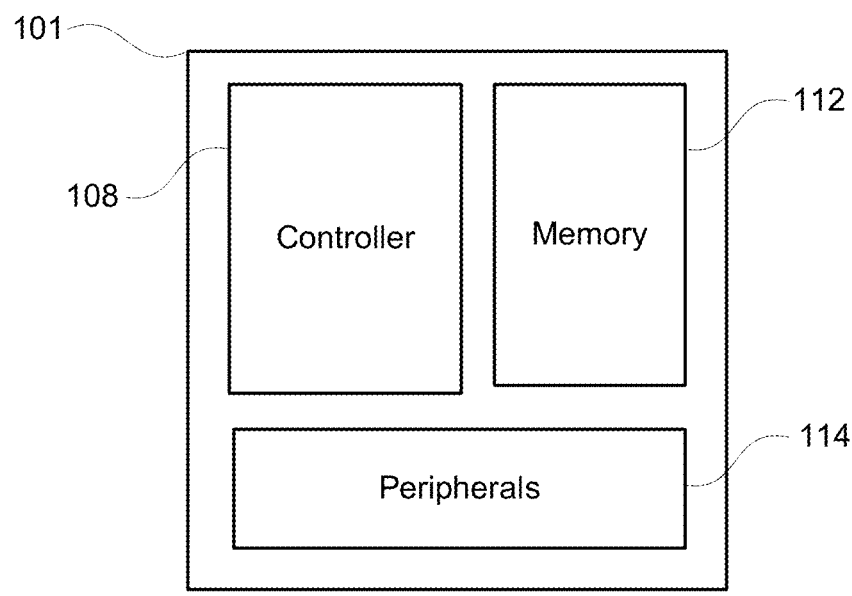
FIG. 4 illustrates an application processor subsystem for a wireless mobile station, which may be employed with aspects of the invention described herein.
Figure 5:
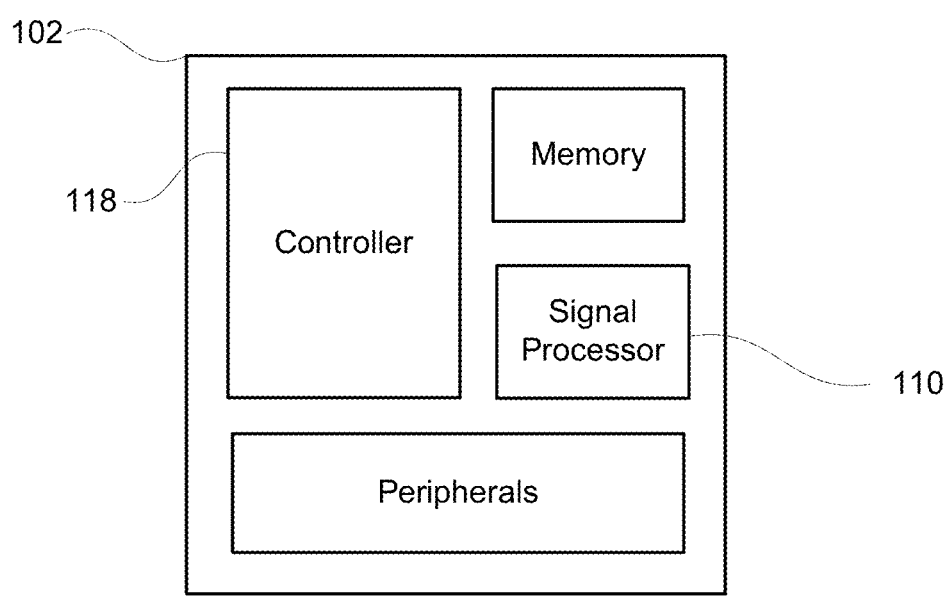
FIG. 5 illustrates a baseband subsystem for a wireless mobile station, which may be employed with aspects of the invention described herein.
Figure 6:
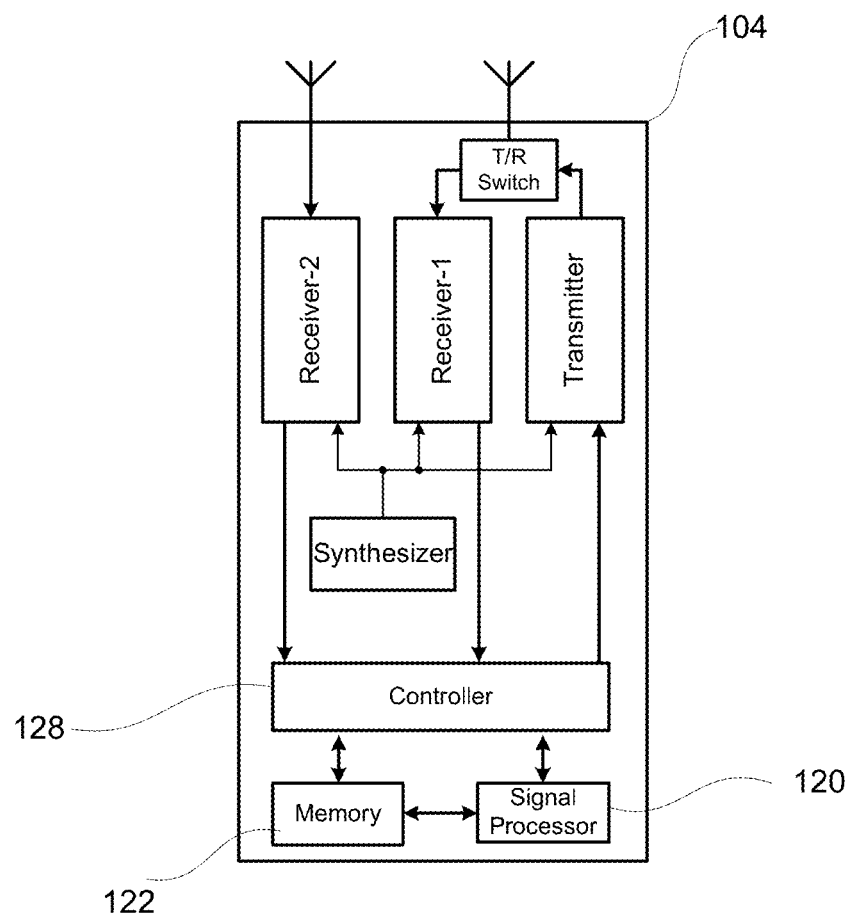
FIG. 6 illustrates an RF subsystem for a wireless mobile station, which may be employed with aspects of the invention described herein.

The application processor subsystem 101 as shown in FIG. 4 may include a controller 108 such as a microcontroller, another processor or other circuitry. The baseband subsystem 102 as shown in FIG. 5 may include a controller 118 such as a microcontroller or other processor. The RF subsystem 104 as shown in FIG. 6 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with the aspects of the present invention.

In FIG. 4 the peripherals 114 such as a full or partial keyboard, video or still image display, audio Interface, etc may be employed and managed through the controller 108.

Aspects of the present invention may be implemented in firmware of the controller 108 of the application processor in FIG. 4 and/or the controller 118 of the baseband subsystem as shown in FIG. 3. In another alternative, aspects of the present invention may also be implemented as a combination of firmware and hardware of the application processor subsystem 101 and/or the baseband subsystem 102. For instance, signal processing functionality of any or all of the FIG. 5 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims.

Aspects of each embodiment may be employed in the other embodiments described herein.

The invention claimed is:

1. A method for searching information of a communication signal received at a communication device from a wireless communication network for a predetermined message, in which the searching includes computation, based on the information of the communication signal, of a remainder of dividing a dividend by a divisor, and in which the divisor is equal to any of $b^k \pm 1$, b and k are integers and b is not a power of another number, the method comprising:
controlling, by a processing device, the searching,
in which the searching includes, for each bit position of a binary representation of the dividend:
subtracting, from a weight of the bit position, an integral multiple of the divisor nearest to the weight of the bit position, to obtain a difference, and
multiplying the difference by a value of the bit position to obtain a product;
controlling, by the processing device, summing the products respectively for the bit positions to obtain a first sum, in which the remainder is the first sum unless the first sum is (i) negative or (ii) positive and greater than the divisor; and
in which the searching includes
when the first sum is negative, adding the divisor recursively to the first sum to obtain a second sum until the second sum is positive, in which the remainder is the second sum when the second sum is positive, and
when the first sum is positive and greater than the divisor, recursively subtracting the divisor from the first sum to obtain a third sum until the third sum is less than the divisor, in which the remainder is the third sum when the third sum is less than the divisor.

2. An apparatus for searching information of a communication signal received at a communication device from a wireless communication network for a predetermined message, in which the searching includes computation, based on the information of the communication signal, of a remainder of dividing a dividend by a divisor, and in which the divisor is equal to any of $b^k \pm 1$, b and k are integers and b is not a power of another number, the apparatus comprising:
circuitry configured to control the searching,
in which the searching includes, for each bit position of a binary representation of the dividend:
subtracting, from a weight of the bit position, an integral multiple of the divisor nearest to the weight of the bit position, to obtain a difference, and
multiplying the difference by a value of the bit position to obtain a product;
in which the searching includes summing the products respectively for the bit positions to obtain a first sum, in which the remainder is the first sum unless the first sum is (i) negative or (ii) positive and greater than the divisor; and
in which the searching includes
when the first sum is negative, adding the divisor recursively to the first sum to obtain a second sum until the second sum is positive, in which the remainder is the second sum when the second sum is positive, and
when the first sum is positive and greater than the divisor, recursively subtracting the divisor from the first sum to obtain a third sum until the third sum is less than the divisor, in which the remainder is the third sum when the third sum is less than the divisor.

3. A wireless communication device comprising:
a receiver to receive a communication signal obtained from a wireless communication network;
a processing device configured to control searching information of the communication signal for a predetermined message, in which the searching includes computation, based on the information of the communication signal, of a remainder of dividing a dividend by a divisor, and in which the divisor is equal to any of $b^k \pm 1$, b and k are integers and b is not a power of another number;
in which the searching includes, for each bit position of a binary representation of the dividend:
subtracting, from a weight of the bit position, an integral multiple of the divisor nearest to the weight of the bit position, to obtain a difference, and
multiplying the difference by a value of the bit position to obtain a product;
in which the searching includes summing the products respectively for the bit positions to obtain a first sum, in which the remainder is the first sum unless the first sum is (i) negative or (ii) positive and greater than the divisor; and
in which the searching includes
when the first sum is negative, adding the divisor recursively to the first sum to obtain a second sum until the second sum is positive, in which the remainder is the second sum when the second sum is positive, and
when the first sum is positive and greater than the divisor, recursively subtracting the divisor from the first sum to obtain a third sum until the third sum is less than the divisor, in which the remainder is the third sum when the third sum is less than the divisor.

* * * * *